United States Patent [19]

Strehl

[11] Patent Number: 4,647,972
[45] Date of Patent: Mar. 3, 1987

[54] METHOD AND CIRCUIT ARRANGEMENT FOR CORRECTION OF IMAGE DISTORTION

[75] Inventor: Herbert Strehl, Munich, Fed. Rep. of Germany

[73] Assignee: Siemens Aktiengesellschaft, Berlin and Munich, Fed. Rep. of Germany

[21] Appl. No.: 592,682

[22] Filed: Mar. 23, 1984

[30] Foreign Application Priority Data

Mar. 31, 1983 [DE] Fed. Rep. of Germany ....... 3311911

[51] Int. Cl.$^4$ .......................... H04N 5/14; H04N 7/08
[52] U.S. Cl. ..................................... 358/160; 358/142; 358/163; 358/284
[58] Field of Search ............... 358/160, 162, 163, 284, 358/142

[56] References Cited

U.S. PATENT DOCUMENTS

| | | | |
|---|---|---|---|
| 4,376,289 | 3/1983 | Reitmeier et al. | 358/163 |
| 4,464,674 | 8/1984 | Schulz et al. | 358/163 |
| 4,498,104 | 2/1985 | Schulz | 358/163 |
| 4,517,600 | 5/1985 | Reitmeier | 358/163 |

FOREIGN PATENT DOCUMENTS 3114275  11/1982  Fed. Rep. of Germany.

Primary Examiner—James J. Groody
Assistant Examiner—Michael D. Parker
Attorney, Agent, or Firm—Thomas H. Jackson

[57] ABSTRACT

Method and apparatus for the correction of image distortion in the digital transmission of video signals, in which at the receiving end a comparison is made between the received signal values and estimated video signal values computed from adjacent video signal values. When a prescribed threshold value is exceeded by the amount of the difference between the video signal value and the associated estimated video signal value, the corresponding estimated video signal value is forwarded instead of the received video signal value. A feature of the present method and apparatus is their ability to distinguish edges of objects when there are sharp fluctuations in expected signal level values.

6 Claims, 7 Drawing Figures

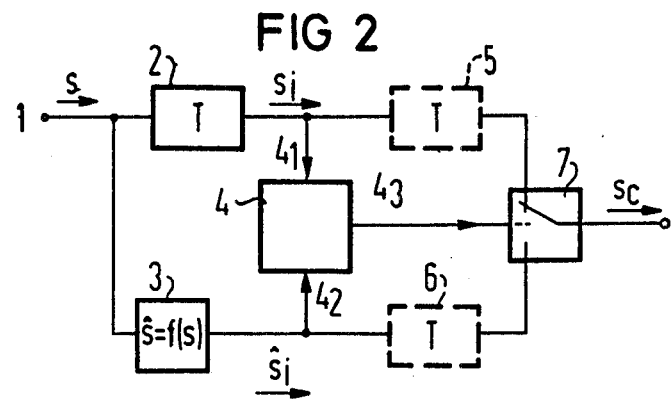
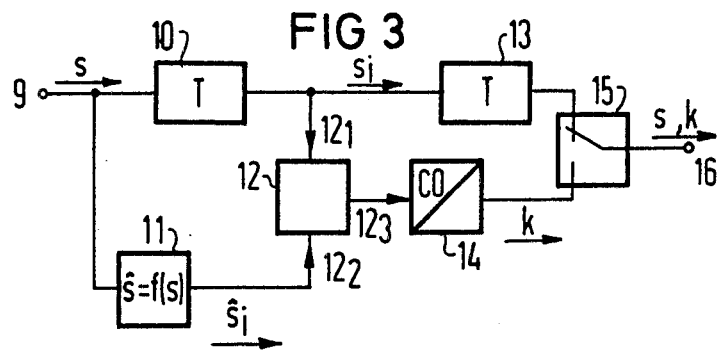
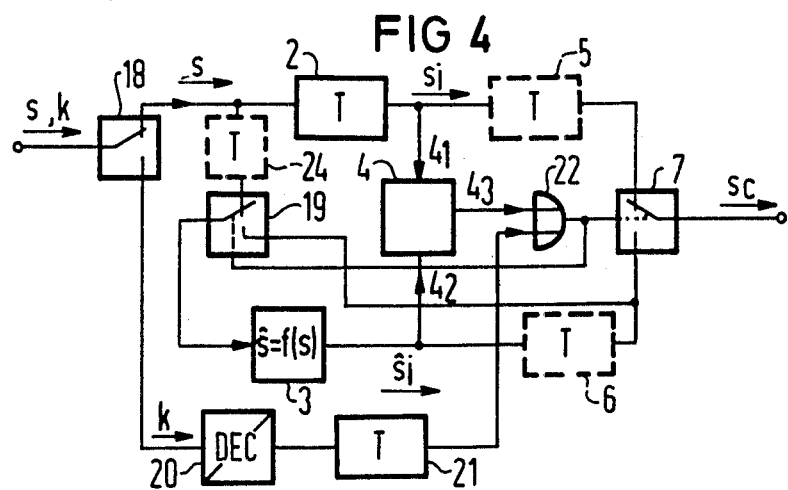

METHOD AND CIRCUIT ARRANGEMENT FOR CORRECTION OF IMAGE DISTORTION

BACKGROUND OF THE INVENTION

The invention relates to a method and apparatus for the correction of image distortion in the digital transmission of video signals.

In the digital transmission of video signals in the digital telecommunications networks of the future, a bit error rate of about $1 \times 10^{-6}$ is to be expected. Even at this low bit error rate, the brightness or the color of individual image points will be so distorted that the image quality will be noticeably impaired. On some sections of the transmission line the bit error rate may be substantially higher, for example $1 \times 10^{-2}$. For the correction of the bit error itself, the error-correcting processes known from the field of data communication can be used. In this case it is sufficient to provide protection for the bits with the highest value of the image signal values to be transmitted. A disturbance of the bits with low values produces only a slight distortion of the color or brightness and therefore appears to be less troublesome. A disadvantage in the use of a conventional distortion correction procedure is the relatively high redundance, which results in an increase in the transmission rate. In addition, the correction capacity is exceeded even at relatively low bit rates, which may actually result in making the image quality worse than in a system without distortion correction.

Depending on the coding selected, substantial switching procedures are often necessary.

One correction circuit is known from U.S. Pat. No. 4,376,289; however, there is no means of identifying or predicting sharp contrasts in brightness which are truly present.

SUMMARY OF THE INVENTION

The object of the invention is to provide a simple and effective method for the correction of image distortion to be used with the digital transmission of video signals, which requires only a minimal amount of additional transmission capacity and which continues to operate satisfactorily even at very high bit error rates.

It is another object of the invention to provide simple and effective apparatus for the correction of image distortion to be used for the digital transmission of video signals, which requires only a minimal amount of additional transmission capacity and which continues to operate satisfactorily even at very high bit error rates or when data truly shows great contrasts in brightness.

On the basis of the art previously described, these objects are accomplished by having a comparison take place on the receiving end between the values of the received video signals and estimated video signal values obtained from adjacent video signal values, and by forwarding, in the event that the amount of the difference between the value of the video signal and the associated estimated video signal value exceeds a predetermined threshold value, the corresponding estimated video signal value instead of the value of the video signal received.

In the method according to the invention, it is not the bit error itself, but the image distortion caused by it, that is corrected. A correction is made only when the image distortion seems likely to have a serious effect, in other words, when it exceeds a certain magnitude, such as the threshold value. In this method it is assumed that adjacent video signal values are correlated with one another. In terms of the circuitry, the method can be implemented in the most simple way when, in each case, two or more video signal values that follow one another in time are considered. This corresponds to the image points of a line. However, it is also possible to have a vertical correlation of video signal values, or even to consider further video signal values in the vicinity of the video signal value that is to be examined. If this video signal value differs significantly from the adjacent video signal, then the estimated video signal value that has been computed from the adjacent video signal values is used instead of the value that is probably distorted.

It is desirable to transmit an additional characteristic when the difference between the video signal value and an adjacent video signal value or the computer estimated video signal value exceeds the predetermined threshold value.

In principle, it makes no difference whether the difference between two successive video signal values, or that between the last video signal value and an estimated value obtained from the preceeding video signal values, is computed. Linear extrapolation from two preceding video signal values is not the only way to compute the estimated value. Non-linear extrapolation often gives estimated video signal values that are more in line with the overall flow of signals.

In order to avoid any falsification of the image content when major changes in the video signal values are transmitted, as occurs, for example, at the edges of objects, the image distortion correction must not occur. Identification of these video signal values might be accomplished, for example, by using a special bit, which is transmitted with each video signal value, or for example, by numerical transmission of the critical video signal value by means of numerical identification in the line scanning gap. This problem can also be reduced by using the timewise correlation of the corresponding video signal values in successive images.

It is desirable to have the highest-order bits in the video signal value protected by a coding unit that recognizes values.

The error-recognition coding in this case takes place over the task of identification.

It is desirable at the receiver end, when the threshold value is exceeded by the difference between the video signal value and an adjacent video signal value or the estimated video signal value to have the estimated video signal values forwarded, if this excess is confirmed by the identifier or accepted as correct on the basis of the error-recognition coding.

In order to avoid any falsification of the image content when there are major differences between adjacent video signal values, the image distortion correction is switched off if an appropriate identifier is received or if an unfalsified signal value is confirmed by the coding.

It is desirable, when the difference between two adjacent video signal values exceeds the threshold value, to forward the received video signal value, if the difference between the latter and at least one other bordering video signal value is smaller than the predetermined threshold value.

In this case, there is no necessity for any additional identification or an error-recognition coding in order to ensure the transmission of successive video signal values that differ markedly from one another, as long as only two adjacent video signal values are approximately equal. Video signal values that are next to one another in horizontal, vertical diagonal lines, or even—although in this case considerable use of the memory is necessary—the corresponding video signal values of successive images, can be regarded as adjacent video signal values. If it is not desired to use the timewise correlation, then any individual signal value that deviates strongly from the adjacent signal values is suppressed; however, this should have a detrimental effect only in extremely rare cases.

In designing the circuits to implement this method, it is desirable, in a receiving section, to have the video signal values fed to the first input of a comparator and to the input of a computing circuit whose output is connected with the second input of a comparator whose output drives an electronic changeover switch to whose inputs are fed the received video signal values and the estimated video signal values.

The computing circuit calculates an estimated video signal value from the video signal values that have already been received, which is then compared with the corresponding received video signal value.

If the difference between the two values is so great that the predetermined threshold value is exceeded, then the electronic changeover switch is driven by the comparator in such a manner that the estimated video signal value is switched to the output. The electronic changeover switch can be in the form of a timing circuit through which the video signal value or the corresponding estimated video signal value are sent to the output of the circuit arrangement as a code word by delay lines or memories.

The computing circuit might consist, for example of a predictor, which in the simplest case, carries out a linear extrapolation. In this case, the difference between two successive signals is computed and this difference is added to the last signal value. By this means the new estimated video signal value, which is compared with the next video signal value received, is obtained.

Naturally, several of the video signal values that have already been received can be used to compute the estimated video signal value. Similarly, it is also possible to compute several successive estimated video signal values when distorted video signal values are received. The construction of predictors is sufficiently known from DPCM technology. Instead of a predictor, it is also possible, of course, to use an interpolator. With linear interpolation as a starting point, it is also possible to use more complex embodiments of the interpolator. In general, however, only one or a few video signal values will be used, which have been received later than the video signal value to be examined. The interpolator, generally offers a somewhat greater accuracy when the circuitry is more extensive and the delay time for the circuit arrangement is longer, which, however, never has a detrimental effect.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

FIG. 2 shows diagrammatically the principal circuit diagram of a receiving section.

FIG. 3 shows diagrammatically the principal circuit diagram of a sending section.
FIG. 4 shows diagrammatically the principal circuit diagram of an auxiliary receiving section with a decoder for selection control by means of an additional identification.

DETAILED DESCRIPTION

Figure 1:
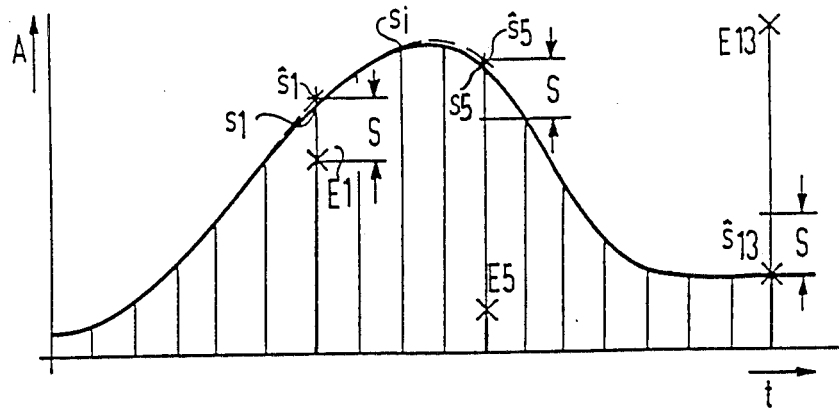
FIG. 1 shows graphically a section of a video signal.

In FIG. 1 which shows a section of the video signal, amplitudes A of the individual video signal values S are connected by an envelope curve. Instead of the signal value $\hat{s}_1$, however, an erroneous signal value E1 has been received. The estimated video signal value $s_1$ computed from the preceding signal values deviates only a minimal degree from the actual video signal value $s_1$. However, because the erroneous video signal value E1 lies within the threshold value S with reference to the computed estimated video signal value $\hat{s}_1$, no image distortion correction takes place. After a number of correct signal values $s_1$, another erroneous signal value E5 is received instead of the correct video signal value $s_5$. The erroneous signal value E5 differs from a computed estimated video signal value $\hat{s}_5$ by more than the threshold value S. As a result, instead of the erroneous signal value E5, the respective estimated video signal value $\hat{s}_5$ is forwarded. After several signal values have been received correctly, an erroneous signal value E13 is received. This erroneous signal value also deviates from the computed estimated video signal value $\hat{s}_{13}$ by more than the permissible threshold value S. Thus again the computed estimated video signal value $\hat{s}_{13}$ is forwarded instead of the erroneous signal value E13.

It can be seen from FIG. 1, that in the case of a correlated signal the computed estimated signal values correspond very closely to the signal values s. In general a linear extrapolation should be sufficient; the use of several signal values and an improved extrapolation, for example, with the use of a polynomial, gives even better results. An interpolation process for computing the estimated signal values is not necessary as a general rule.

Referring to FIG. 2, the principal circuit diagram of a receiving section is shown in which video signal values s are fed to input 1 of the circuit arrangement. A delay line 2 is connected to input 1. The output of the delay line is connected with the first input $4_1$ of a comparator 4 and with the input of a second delay line 5. The output of the second delay line is connected with an electronic changeover switch 7, at whose output 8 are emitted the corrected video signal values $s_c$. At input 1 there is also connected a computing circuit 3, which calculates the estimated video signal values $\hat{s}_i$. The output of the computing circuit 3 is connected with a second input $4_2$ of comparator 4 and through a third delay line 6 with the electronic changeover switch 7. The electronic changeover switch is driven by output $4_3$ of comparator 4.

From the video signal values s that are fed to input 1, the estimated video signal values $\hat{s}_1$ are calculated in computing circuit 3. In this principal circuit diagram, it is assumed that computing circuit 3 has a specified delay time, which is compensated for by the first delay line 2.

If computing circuit 3 includes an interpolation circuit, this first delay line is likewise necessary. The comparator compares in each case a computed estimated video signal value $\hat{s}_i$ with the associated video signal value $s_i$. If the amount of the deviation is greater than the predetermined threshold value, then the computed estimated video signal values $\hat{s}_i$ arrive through the electronic changeover switch 7 at output 8 of the circuit arrangement. If, on the other hand, the difference between the computed estimated video signal value $\hat{s}_i$ and the associated video signal value $s_i$ does not exceed the predetermined threshold, then the video signal values $s_i$ are transmitted at the output. The corrected signal values that are transmitted are designated by $s_c$.

The second and third delay lines, 5 and 6, are always necessary when the circuit arrangement operates in series. If, on the other hand, the processing of the signal values is done in parallel, these delay lines can be dispensed with, and the corrected signal values can be taken over directly from the first delay line 2 or from computing circuit 3.

The delay elements can be either transport delay lines or memory components, depending on the circuit design in each case.

Typically, comparator 4 can be a conventional hardware substraction circuit (e.g. Texas Instruments component SN54181) which is connected to a threshold value circuit.

Figure 6:
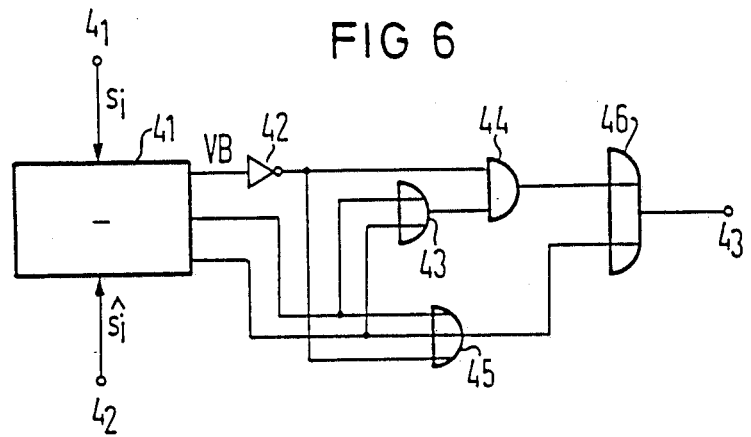
FIG. 6 shows diagrammatically a comparator.

In the embodiment shown in FIG. 6, the estimated video signal value $\hat{s}_i$ and the video signal value $s_i$ are fed to the subtraction circuit 41 through the inputs $4_1$ and $4_2$. The highest order bits of the difference are examined for positive and negative differences. This is done through OR gate 43 with the subsequent AND gate 44 or through NOR gate 45. The sign bit VB is fed through an inverter 42 to the AND gate 44 and the NOR gate 45. The outputs of these gates are combined through an OR gate 46.

Figure 7:
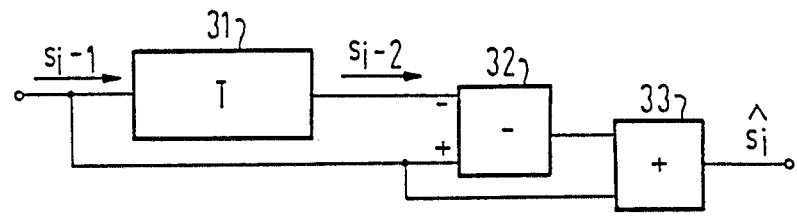
FIG. 7 shows diagrammatically a computing circuit.

In the simplest case, computing circuit 3 consists of a subtraction circuit, which computes the difference between two successive video signal values $s_{i-1}$, or $s_{i-2}$, $s_{i-1}$, and an addition circuit, in which this difference is added to the last video signal value ($\hat{s}_i = s_{i-1} + s_{i-1} - s_{i-2}$) (see FIG. 7). This computing circuit includes a delay line 31, whose input and output are connected with the inputs of another subtraction circuit (e.g. Texas Instruments Component SN54181), and an addition circuit 33, whose inputs are connected with the output of substraction circuit 32 or the input of delay line 31.

So that the circuit arrangement shown in FIG. 2 does not result in the suppression of correct video signal values, an identifier is included at the sender to indicate substantial differences in the video signal values. This is shown in FIG. 3, where the sending section includes a delay line 10, which, together with a computing circuit 11, is connected to input 9. The outputs of delay line 10 and computing circuit 11 are fed to a first input $12_1$, or second input $12_2$ of a comparator 12, whose output $12_3$ drives a coder 14. The output of this coder is connected to an electronic changeover switch 15, to which the signal values $s_i$ are fed through an additional delay line 13. The output of the electronic changeover switch 15 is designated 16. The receiving section described above was designed to be similar to this sending section. Every time that a comparison of the computed estimated video signal values $\hat{s}_i$ with the video signal values $s_i$ shows that the predetermined threshold value has been exceeded, an identifier k is emitted through the coder 14. This is combined by the electronic changeover switch 15 with the video signal values $s_i$ into a multiplex signal s, k. This identifier might consist of a bit that is assigned to every video signal value, but the identifier can also be transmitted, as already explained above, in the blank zone before the transmission of a video line.

The coder is responsible for the setting of the corresponding bits, or else inserting an identifying combination. It can take the form of a shift register by which one or more bits are sent in the event of an identification.

The principal circuit diagram in FIG. 4 serves to explain the mode of operation of the identification. The receiving section in FIG. 4 corresponds for the most part with the receiving section shown in FIG. 2. First delay line 2, computing circuit 3, comparator 4, delay lines 5 and 6, and electronic changeover switch 7 are likewise included. The video signal values 3 are fed to computing circuit 3 through a fourth delay line 24 and a second electronic changeover switch 19. The input of circuit arrangement 1 leads to a third electronic changeover switch 18, which operates as a demultiplexer and separates the signals received into the video signal values and identifier k. Identifier k arrives at a decoder 20, whose output is connected through a fifth delay line 21 with an OR gate 22, whose second input is connected with the output of comparator 4, and whose output drives both electronic switch 7 and second electronic switch 19, whose second input is connected to the output of third delay line 6. If no identifier is received to indicate that a difference between the video signal value $s_i$ and the estimated video signal value $\hat{s}_i$ exceeds the predetermined threshold value, then the mode of operation of the principal circuit shown in FIG. 4 corresponds for the most part with the circuit arrangement shown in FIG. 2. If switching occurs from a received video signal value to the computed estimated video signal value, which is fed through the electronic changeover switch to output 8 of the circuit arrangement, then this estimated video signal value $\hat{s}_i$ is also fed, through the second electronic changeover switch 19 to the input of computing circuit 3, which uses it as part of the computation of the next estimated video signal value $\hat{s}_{i+1}$. By this means the use of erroneous video signal values S in the computation of the estimated video signal value is prevented to the largest possible extent.

If an identifier k is recognized by decoder 20, then the electronic changeover switch 7 is set at the right time through the fifth delay line 21 by the OR gate 22 to select the video signal values $s_i$, even though the predetermined threshold value is exceeded.

If only one bit of the received video signal values is used as an identifier, then only that bit must be examined by the decoder. Otherwise, it consists of a gate circuit, through which a binary combination that is used as the identifier will be evaluated.

Figure 5:
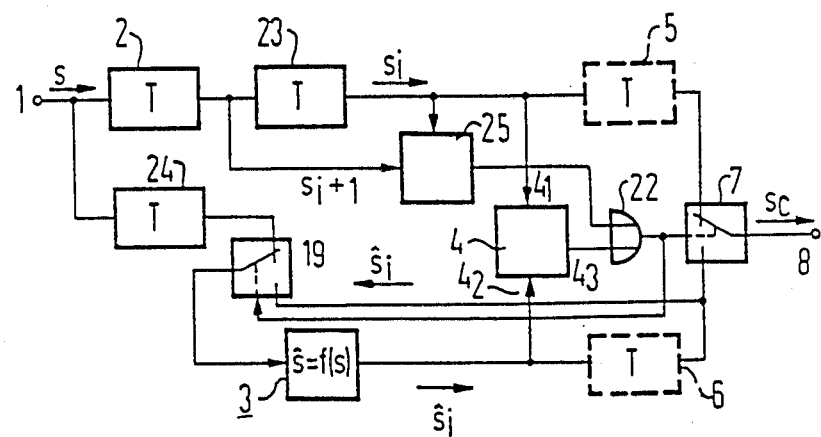
FIG. 5 shows diagrammatically a variant of the receiving section, which permits the correct transmission of successive video signal values which differ greatly from one another.

FIG. 5 shows a variant of the receiving section which makes it possible to achieve a satisfactory result without the identification of major differences among successive video signal values.

This circuit arrangement corresponds for the most part to the one in FIG. 4; however, electronic changeover switch 18 at input 1, decoder 20 and the fifth delay line 21 are omitted. Instead, a second delay line 23 is connected to the first delay line 2 in the path of the video signal elements. The input and output of delay line 23 are connected to the inputs of a second comparator 25, whose output is connected with an input of OR gate 22.

Two adjacent video signal values $s_i$ and $s_{i+1}$ are fed to the second comparator 25 through delay line 23. When a comparison is made between the video signal value $\hat{s}_i$ that is fed to the first comparator 4 and the estimated video signal $s_i$ that is computed from preceding video signal values, it turns out that the permissible threshold value has been exceeded. At the output of comparator 4 there is a logic zero, which would switch electronic changeover switch 7 to the selection of the computed estimated video signal value $\hat{s}_i$, unless, as the result of a small difference existing between the video signal values s and $s_{i+1}$, the second comparator 25 emits a logic one, which causes the electronic changeover switch 7 through OR gate 22 to select the received video signal value $s_i$.

With this circuit arrangement it is also possible to transmit the great differences between adjacent video signal values that occur over image edges, without it being necessary to transmit additional information. On the other hand, individual signal values with a large deviation are suppressed.

There has thus been shown and described a novel method and circuit arrangement for correction of image distortion which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a method for correction of image distortion in the digital transmission of video signals, the improvement comprising the steps of:

at a transmitting end,
    (a) comparing an actual video signal value and a corresponding estimated video signal value computed from adjacent actual video signal values, and, if the difference between the actual and estimated video signal values exceeds a predetermined threshold value, transmitting an additional identifier character;

at a receiving end,
    (b) comparing a received video signal value and a corresponding estimated video signal value computed from adjacent received video signal values; and
    (c) forwarding the corresponding estimated video signal value instead of the received video signal value when a predetermined threshold value is exceeded by the amount of the difference between the received video signal value and the corresponding estimated video signal value; but
    (d) forwarding the received video signal value when the threshold value is exceeded by the difference between the received video signal value and the corresponding estimated video signal value if this excess is confirmed by the receipt of the additional identifier character.

2. A circuit arrangement for the correction of image distortion in the digital transmission of video signals comprising at a transmitting end, a comparator having a first input for receiving delayed actual video signal values, and a computing circuit to which actual video signal values are fed, the output of the computing circuit being connected to a second input of the comparator, the output of the comparator being fed to a coder whose output is connected in turn with an electronic changeover switch, the electronic changeover switch emitting identifier characters provided by the coder or for emitting delayed, actual video signal values.

3. The circuit arrangement according to claim 2, wherein the computing circuit is a circuit for predicting actual video signal values by interpolation.

4. A circuit for the correction of image distortion in the digital transmission of video signals comprising, at a receiving end, a comparator for comparing a received video signal value with a corresponding estimated video signal value computed from adjacent received video signal values, the comparator, whenever a predetermined threshold value is exceeded by the amount of the difference between the received video signal value and the corresponding estimated video signal value, activating the forwarding of the corresponding estimated video signal value via a logic connection instead of the received video signal value, a first delay line for providing the received video signal value to a first input input of the comparator,
    a second delay line for providing the adjacent received video signal values toward input of a computing circuit,
    the computing circuit for computing the corresponding estimated video signal value, the output of the computing circuit being provided toward a first electronic changeover switch, the input of the computing circuit being either the received video signal value or the corresponding estimated video signal value,
    the first electronic changeover switch for forwarding either the corresponding estimated or received video signal values,
    the circuit further comprising a decoder to which is fed a received identifier character, a delayed output of the decoder, together with the output of the comparator, for activating the first electronic changeover switch via the logic connection, and
    a second electronic changeover switch, connected before the input of the computing circuit and after the second delay line, for providing to the computing circuit the corresponding estimated video signal value when the corresponding estimated video signal value is to be forwarded instead of the received video signal value.

5. The circuit arrangement according to claim 4 wherein the, computing circuit is a circuit for computing the corresponding estimated video signal value by interpolation.

6. A circuit for the correction of image distortion in the digital transmission of video signals comprising, at a receiving end, a first comparator for comparing a received video signal value and a corresponding estimated video signal value computed from adjacent received video signal values and, whenever a predetermined threshold value is exceeded by the amount of the difference between the received video signal value and the corresponding estimated video signal value, for activating the forwarding of the corresponding estimated video signal value via a logic connection instead of the received video signal value, a first delay line for providing the received video signal valves to a first input of a second comparator and further through a second delay line to a second input for the second comparator, to a first input of the first comparator and toward a first electronic changeover switch, the second delay line, the second comparator, receiving the adjacent received video signal values at its inputs, for examining their difference, an output of the first comparator and an output of the second comparator for driving, via the logic connection, the first electronic changeover switch, the first electronic changeover switch for forwarding either the received video value or the corresponding estimated video signal value, a second electronic changeover switch, being connected before an input of a computing circuit and being switchable between two inputs, for providing either the received video signal value or the corresponding estimated video signal value to the computing circuit, and the computing circuit for computing the corresponding estimated video signal value from the adjacent received video signal values for output to the second input of the first comparator and, if selected, toward the first electronic changeover switch for forwarding.

* * * * *